US006728769B1

(12) United States Patent
Hoffmann

(10) Patent No.: US 6,728,769 B1
(45) Date of Patent: Apr. 27, 2004

(54) METHOD AND APPARATUS FOR PROVIDING A HIGHLY INTERACTIVE TRANSACTION ENVIRONMENT IN A DISTRIBUTED NETWORK

(75) Inventor: John T. Hoffmann, Newark, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 667 days.

(21) Appl. No.: 09/588,043

(22) Filed: Jun. 5, 2000

Related U.S. Application Data
(60) Provisional application No. 60/202,089, filed on May 4, 2000.

(51) Int. Cl.[7] .............................................. G06F 15/173
(52) U.S. Cl. ........................ 709/225; 709/229; 709/239; 709/242; 705/2; 705/3; 707/102; 707/104.1
(58) Field of Search ................................. 709/255, 224, 709/203, 225, 229, 238; 707/102, 104.1; 705/2, 3

(56) References Cited

U.S. PATENT DOCUMENTS

| | | | |
|---|---|---|---|
| 5,742,768 A | | 4/1998 | Zamora et al. |
| 5,764,736 A | * | 6/1998 | Shachar et al. .......... 379/93.09 |
| 6,237,035 B1 | * | 5/2001 | Himmel et al. ............. 709/224 |
| 6,385,589 B1 | * | 5/2002 | Trusheim et al. ............... 705/2 |
| 6,446,111 B1 | * | 9/2002 | Lowery ....................... 709/203 |
| 6,480,865 B1 | * | 11/2002 | Lee et al. .................... 715/523 |
| 6,516,349 B1 | * | 2/2003 | Lieberman ................... 709/225 |
| 6,546,397 B1 | * | 4/2003 | Rempell ...................... 707/102 |

FOREIGN PATENT DOCUMENTS

| EP | 0798655 A | 10/1997 |
|---|---|---|

OTHER PUBLICATIONS

"Multi–State Icon", IBM Technical Disclosure Document, IBM Corp., New York, US, vol. 35., No 1A, Jun. 1, 1992, pp. 338–339.

"Distributed Database Access in a Corporate Environment Using JAVA", N.N. Duan, Computer Networks and ISDN Systems, North Hollard Publishing, Amsterdam NL, vol. 28, No. 11, May 1, 1996, pp. 1149–1156.

European Search Report from related PCT application.

* cited by examiner

Primary Examiner—Bunjob Jaroenchonwanit
Assistant Examiner—Phuoc Nguyen
(74) Attorney, Agent, or Firm—Beyer Weaver & Thomas, LLP

(57) ABSTRACT

In a multithreaded computing environment, a platform independent method for providing a highly interactive transaction session between a browser residing on a client computer and a data base coupled to a server computer is provided. A web page that includes a plurality of input selection icons and an update icon is requested and displayed by the client computer. A user provides selection data by selecting an input using one of the selection icons which is then sent by the browser to the server computer. The server-side data base is then updated based in part upon the selection data. Once the database has been updated, the update icon only is refreshed indicating that the database has been successfully updated.

8 Claims, 5 Drawing Sheets

METHOD AND APPARATUS FOR PROVIDING A HIGHLY INTERACTIVE TRANSACTION ENVIRONMENT IN A DISTRIBUTED NETWORK

CROSS-REFERENCE TO A RELATED APPLICATIONS

This application takes priority under 35 U.S.C. §119(e) of U.S. Provisional Patent Application No. 60/202,089, filed May 4, 2000, and entitled "METHOD AND APPARATUS FOR PROVIDING A HIGHLY INTERACTIVE TRANSACTION ENVIRONMENT IN A DISTRIBUTED NETWORK" naming John T. Hoffmann as inventor and assigned to the Assignee of the present application which is also incorporated herein by reference in its entirety for all purposes.

BACKGROUND OF THE INVENTION

1. Field of Invention

The invention relates generally to computer systems. More particularly, methods and apparatus for providing a highly interactive environment in a distributed computer network are disclosed.

2. Description of Relevant Art

Generally speaking, a browser is an application program that provides a way to look at and interact with information on distributed computer networks such as the Internet. In particular, a Web browser is a client program that uses the Hypertext Transfer Protocol (HTTP) to make requests of Web servers throughout the Internet on behalf of the browser user. One of the most recent uses of browsers is in the realm of electronic (e-) commerce in which any number of client side users (i.e. "e-customers") interact in a real time basis with any number of server side processors (i.e., "e-sellers") over the Internet. In order to transact business in a Web-based environment, browsers typically execute Web commerce applications specifically designed to facilitate e-commerce transactions such as requesting quotes, selecting options and assembling components into complex bundles, and placing orders.

In this regard, successful Web commerce applications must be capable of automating a customer through the entire buying cycle, from initial inspection to final purchase and shipping, in addition to providing the customer all relevant information required to make a buying decision and providing customer guidance. As the complexity of the buying cycle and/or the purchases themselves increases—for instance, from buying office supplies to buying mainframe computers—a general purpose Web commerce application must scale its ability to manage this complexity. In order to accomplish this, a general purpose Web commerce application must be fast loading and highly responsive in "click over click" type scenarios in order to support highly interactive customer sessions such that a buyer can input any and all relevant information quickly and with apparently little or no delay in application response.

Conventional attempts to construct general purpose e-commerce application utilize the common gateway interface (CGI) to process user input and present a corresponding response. As an example, as shown in FIG. 1, a distributed computer system 100 includes a client computer 102 that is coupled to a server (host) computer 104. The computer 102 includes a browser application 106 that, in turn, includes a requested Web page 108. In order to enter a particular order, for example, a user will first select a particular item to purchase as represented by one of the clickable product icons 114-1 through 114-3 included in the WEB page 108. By clickable, it is meant that the user will typically utilize an input device such as a mouse, stylus, or any other appropriate pointing or non-pointing device to generate a user input event by "clicking" on the icon.

Once selected, the user will proceed to click on the input icon appropriate to the item desired, or in some cases, will enter text in a text field 116 provided. In either case, once all the appropriate input information has been appropriately entered, the user must then click a "SUBMIT" button 118 in order to have the data provided by the user be sent to the server computer by way of a common gateway interface (CGI) 119. Once received, the script updates a database 120 accordingly. Once the database 120 has been updated, the server computer generates an appropriate HTTP response 121 that has the effect of generating a new WEB page 122 by what is referred to as refreshing. By refreshing, the server computer 104 must load the new WEB page in order to confirm the user's request command to update the database 120. In some cases, the user must repeat this process several times in order to complete a particular transaction that can be wearisome and time consuming, to say the least.

In addition, by requiring several "over the wire" transmissions between the client computer 102 and the server computer 104, there is a not an insubstantial risk that the transaction will be slowed due to network traffic, a slow node, or a system failure. In addition, the time consuming nature of the current state of the prior art may result in a user deciding to not complete a particular transaction out of sheer frustration at the lack of a fast response time.

Therefore, what are desired are a method and an apparatus for providing a highly interactive transaction environment in a distributed network

SUMMARY OF THE INVENTION

In one embodiment of the invention, in a multithreaded computing environment, a platform independent method for providing a highly interactive transaction session between a browser residing on a client computer and a data base coupled to a server computer is disclosed. A requested web page is displayed at the client computer that includes a plurality of input selection icons and an update icon. Selection data corresponding to a user selected input is sent to the server computer by the browser. A server-side data base is updated based upon the selection data and only the update icon is updated to indicate that the data base has been successfully updated.

In a preferred embodiment, the server computer is coupled to a distributed network of computers such as the Internet.

Another embodiment of the invention describes a platform independent apparatus in a multithreaded computing environment that provides a highly interactive transaction session between a browser residing on a client computer and a data base coupled to a server computer. The apparatus includes a web page. The web page includes, in turn, an input selection icon capable of providing selection data based upon a user supplied input event and an update icon configured to notify the user that the database has been successfully updated. The web page also includes an event handler coupled to the input selection icon arranged to receive the selection data and an interaction applet coupled to the update icon arranged to provide an database update signal to the update icon. In a preferred embodiment, when the database has been successfully updated, the update icon only is updated in such a way that a portion of the web page displayed prior to the database update remains substantially unchanged.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

Figure 1:
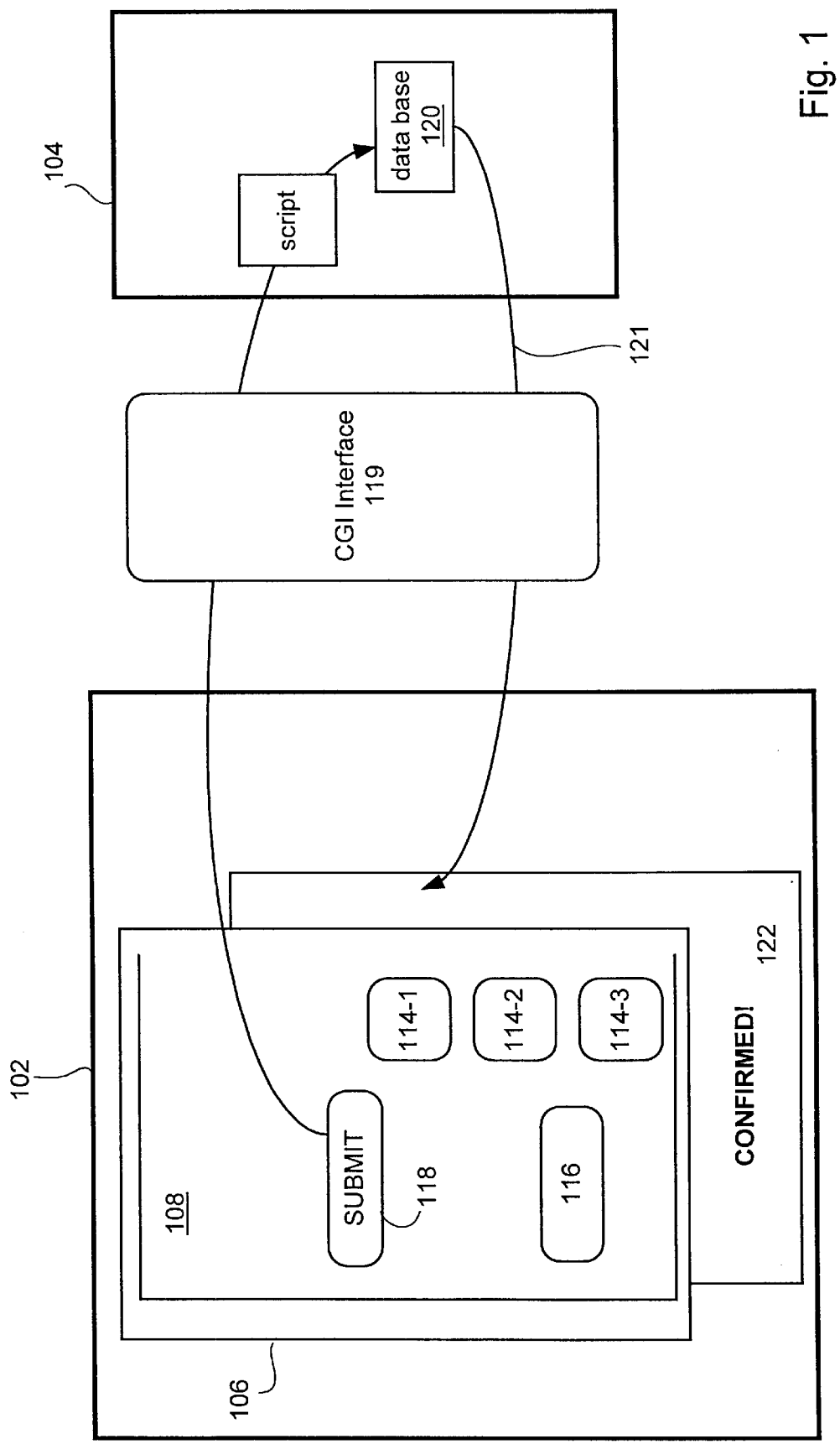
FIG. 1 shows a transaction between a client side user and a server side data base in a conventional browser/server system.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

In the following description, frameworks and methods of providing an apparatus and system for providing real time interaction between a client-side user and a server-side data base in browser/server environment are described. Such browser/server environments are exemplified by, for example, an e-commerce transaction between an e-buyer and an e-seller, a client-side user updating a server-side data base, and the like. Although the invention will initially be described in terms of a multithreaded, object oriented computing system implemented using HTTP requests and responses, it should be noted that the present invention can be used in any system that is capable of handling well defined requests and responses across a distributed network.

It should also be noted that although the invention is described in terms of the Internet, any distributed network could be suitably employed to implement any desired embodiment of the invention. It is one of the advantages of the invention that it is well suited for low bandwidth systems capable of executing client side applications. Such low bandwidth systems include, but are not limited to: virtual private networks direct serial connections across telephone lines ("BBS systems"), and LANs and WANs regardless of network protocol.

When implemented in a network using the HTTP protocol, such as the Internet, in an e-commerce transaction, for example, when an e-buyer (i.e., client) desires to transact a purchase order with an e-seller, the e-buyer generates an HTTP request for a resource identified by a URL (universal resource locator). In one implementation, this request is transmitted by way of a distributed network, such as the Internet, to a server computer. In response to the URL, the server computer provides an HTTP response in the form of an HTML page generally consisting of the "expected" interface page. In a preferred embodiment, the web page is an HTML frameset that transparently contains the expected interface page(s) in one frame. During a login session, the expected interface page includes various login user interface (UI) icons suitable for allowing the client to input a unique user-id and a corresponding password. In the case of an e-commerce transaction, the client running on a client computer, as an e-buyer for example, once authenticated, can place orders for particular goods or services listed on the displayed interface page.

In a preferred embodiment, the user supplied inputs are processed by an applet, or any other appropriately configured client side browser based application. The applet, in turn, causes a server-side data base to be updated based upon the selected input data. The server computer responds to the updating of the server-side data base by refreshing only an update icon in the displayed interface page leaving the remainder of the interface page substantially unchanged. In this way, the user experiences what is substantially a real time interaction between an input action, such as inputting a particular selection (such as a product or service to be ordered) or scheduling a particular event or events without resorting to "flipping" between various web pages or refreshing an entire web page. By just using a small portion of the displayed web page to indicate that the server side data base has been updated, the amount of data that is transferred "across the wire" is substantially reduced greatly increasing the number and type of transactions that can be realistically handled in a low bandpass environment such as the Internet.

The invention will now be described in terms of a browser resident in a client computer that is typically used to execute a highly interactive e-commerce application. It should be noted that in a preferred embodiment, the client computer is what is referred to as a thin client or thin client computer. By thin client computer it is meant that the thin client computer is designed to primarily display graphical user interfaces useful in receiving and transmitting user derived input events, such as clicking and dragging. In addition, the thin client is well suited for displaying in whatever mode is deemed appropriate, various informational displays related to for example, various search results, online conversation textual data, graphics, video, and the like. In this way, the thin client typically does not require substantial computing resources thereby greatly enlarging the scope of devices suitable for hosting the thin client. Such devices include digital appliances such as a personal digital assistant, cellular telephones, and the like.

It should be noted, however, that any applications requiring data processing in a highly interactive environment can also be implemented using the invention, and the invention therefore should not be construed as being limited to e-commerce applications. It should also be noted, that the invention is well suited for any low bandwidth system in which user interactivity is a prime consideration.

Figure 2:
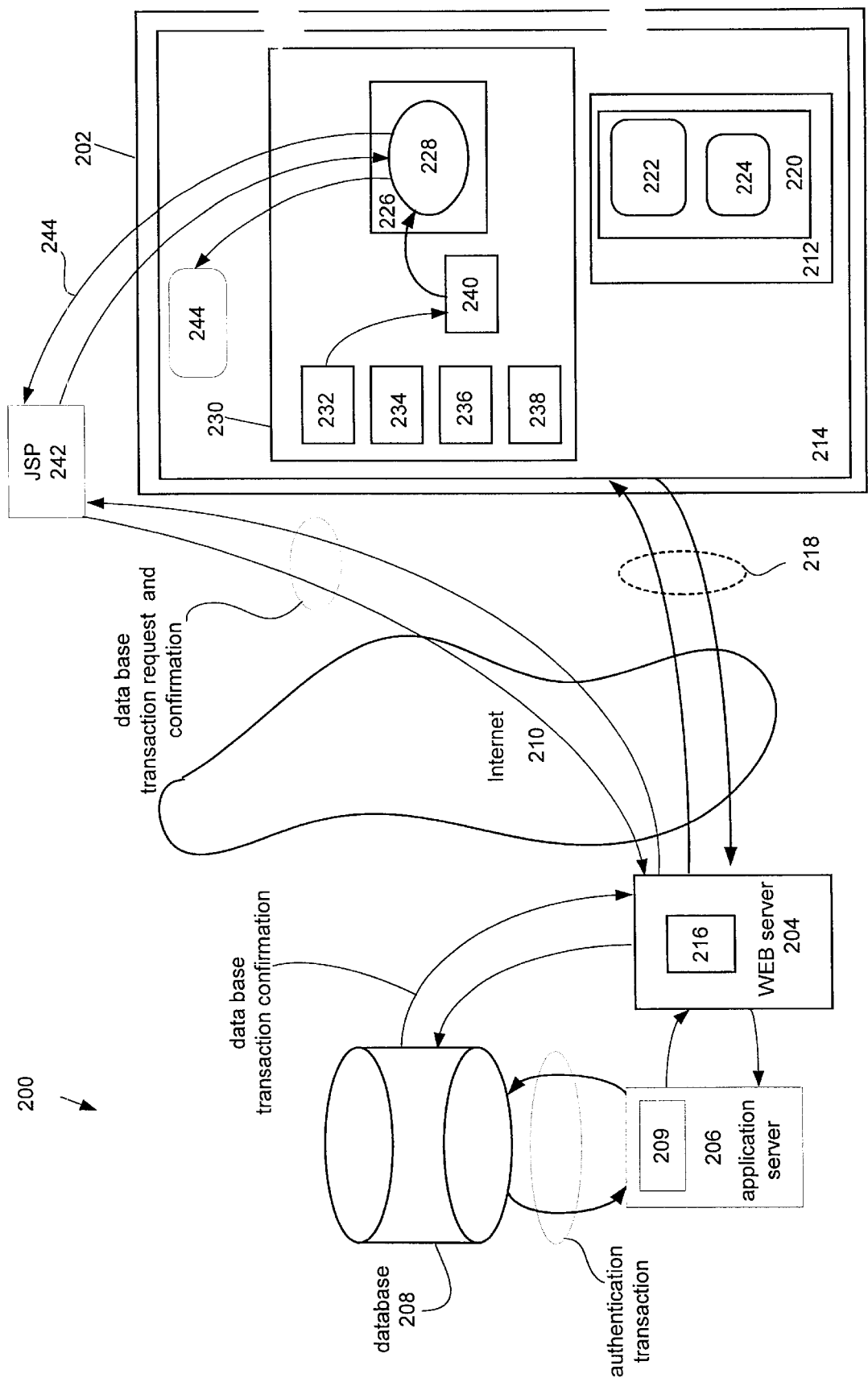
FIG. 2 shows a browser/server system in accordance with an embodiment of the invention is shown.

Referring now to FIG. 2, a browser/server system 200 in accordance with an embodiment of the invention is shown. The system 200 includes a client computer 202 coupled to a WEB server 204, an application server 206, and a data base 208. In a preferred embodiment, the client computer 202 is a thin client computer. Typically, the servers 204–208 are part of a distributed interconnected computer network 210 such as the Internet, but can also be part of a private wide or local area network (WAN/LAN) utilizing HTTP protocols, sometimes referred to as an intranet. It is one of the advantages of the invention that the interconnected computer network can be any low bandwidth system.

In order to facilitate communication between the various users and/or computers that form the network 210, the client computer 202 utilizes the graphical user interface resources presented by a Web page (sometimes referred to as an HTML page) 212 resident in a browser 214, most of which are obtained by various HTTP requests. When a user desires to log on, a particular HTML page 216 is downloaded from the WEB server 204 by the browser 214 generating an HTTP request 218. The URL for the requested page 216 includes information related both to the location of the WEB server computer 204, and to the location within the WEB server computer 204 where the page 216 is located.

In the described embodiment, the HTML page 216 is a frameset formed of a visible HTML page 220 that includes log in user interface (UI) icons 222 and 224 suitably arranged for inputting a unique user-id and associated password, respectively. The user-id and password are then authenticated by the WEB server 204 in cooperation with the application server 206. Once the user has been authenticated, the application server 206 enters a userid entry into a login/logout table 209 in the application server 207. Concurrently, the WEB server 204 downloads a HTML page 226 having a interaction applet 228 embedded therein. The browser 214 then instantiates and allocates a client user interface (UI) frame 230 that includes a plurality of user input icons 232–238.

Once the user has decided on a particular item corresponding to, for example, the selection icon 232, the user initiates a user input event by, in this case, clicking the selection icon 232. The action of clicking the selection icon 232 causes a user input event (also referred to as an "on click stream") to be sent to an event handler 240 that, in turn, sends the appropriate selection data to the interaction applet 228. In some cases, the event handler 240 is a JavaScript onClick event handler well known to those skilled in the art. When the event handler 240 is configured as an onClick event type event handler, the interaction applet 228 passes the javascript arguments received from the Javascript event handler 240 on to a JavaServerPage(JSP) 242 by way of a HTTP request 244.

It is well known that Java Server Page (JSP) is a technology for controlling the content or appearance of Web pages through the use of servlets (small programs that are specified in the Web page and run on the Web server to modify the Web page before it is sent to the user who requested it). Sun Microsystems of Mountain View, Calif., the developer of Java, also refers to the JSP technology as the Servlet API (Application Program Interface). It should be noted that JSP is comparable to Microsoft's Active Server Page (ASP) technology. Whereas a Java Server Page calls a Java program that is executed by the Web server, an Active Server Page contains a script that is interpreted by a script interpreter (such as VBScript or JScript) before the page is sent to the user.

Once the appropriate data has been received by the JSP 242, the JSP 242 directs that that WEB server 204 update the server-side data base 208 according to the selected input. In response, the WEB server 204 sends an HTTP response to the applet 228 by way of the JSP 242 directing the browser 214 to update only an update icon 244 indicating that the server side data base 208 has been successfully updated. In this way, the user experiences a substantially real time interaction since the update icon immediately reflects the effects of the user supplied input data on the data base 208 without the need to refresh the entire, or even a substantial portion of the WEB page.

It should be noted that the real time experience is due in part to the fact that the data base transaction is performed in the background leaving the user free to continue to click on more input icons or leave the current page to read more details on a particular item. Since the transaction is performed in the background, the script on the back-end only needs to perform the data base update and is therefore relieved of the need to perform the much more resource intensive processing required to generate a new page in order to confirm the transaction. Since the page is not refreshed, the user is free to focus on selecting or de-selecting additional items or clicking off to other pages, such as in an on-line catalog.

Figure 3:
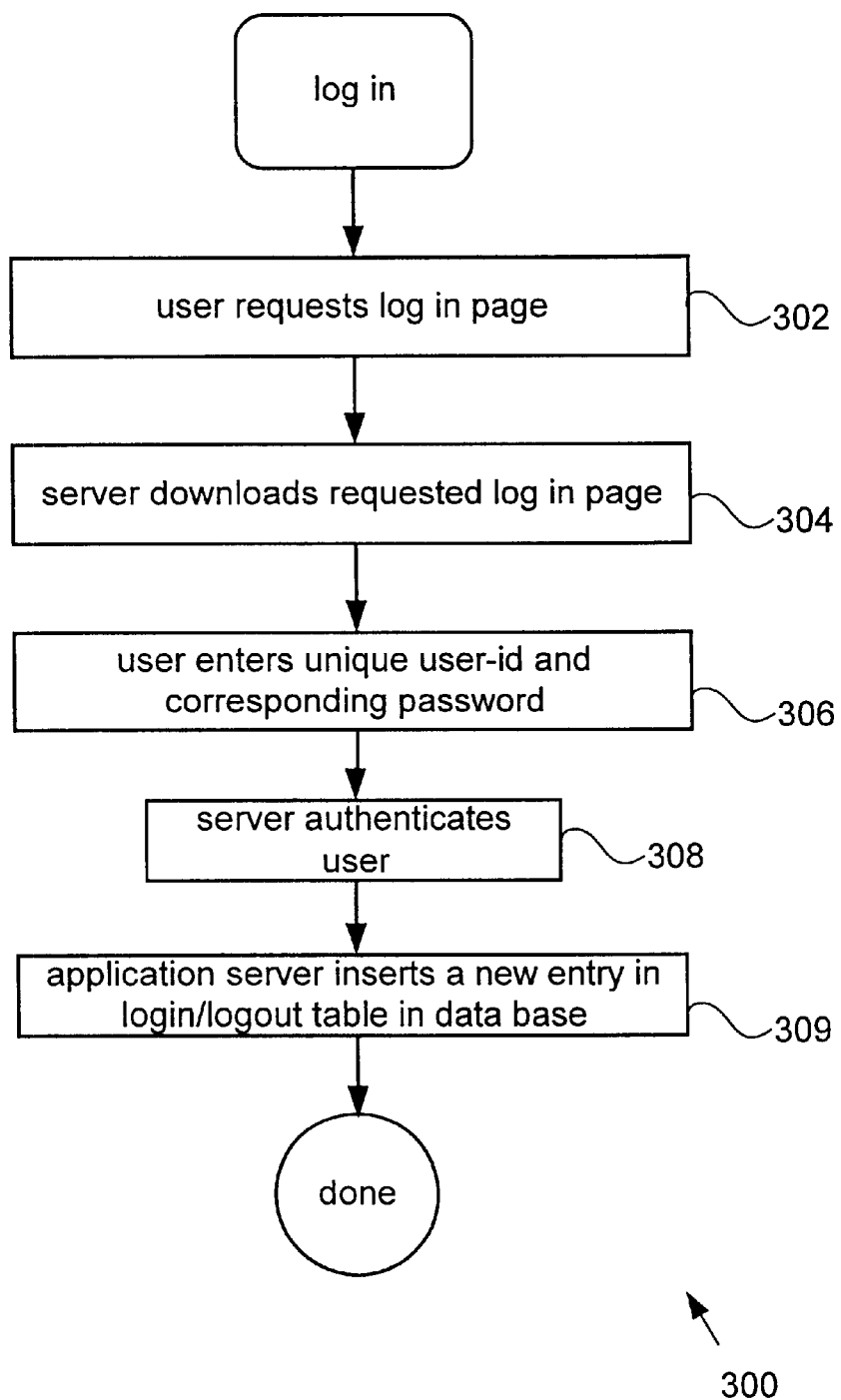
FIG. 3 illustrates a flowchart detailing a process for logging in by a requesting user in accordance with an embodiment of the invention.

FIG. 3 illustrates a flowchart detailing a process 300 for logging in by a requesting user in accordance with an embodiment of the invention. The process 300 begins at 302 with the user requesting a log in page from a WEB server. The WEB server responds to the request by downloading the requested log in page at 304. In a preferred embodiment, the login page includes various UI icons suitable for inputting authentication information such as a unique user-id and password. In order, therefore, to be authenticated, the user enters a unique user-id and associated password at 306. The application server upon receipt of the user-id and password authenticates the user at 308 and at 309 adds a corresponding userid to a row in a login/logout table included in a database. In a preferred embodiment, the database resident in the application server is used to authenticate the user.

Once a user has been properly logged in, an online transaction between the client computer and the server computer can be initiated between the user as a requester and any number of properly logged in and registered target servers.

Figure 4:
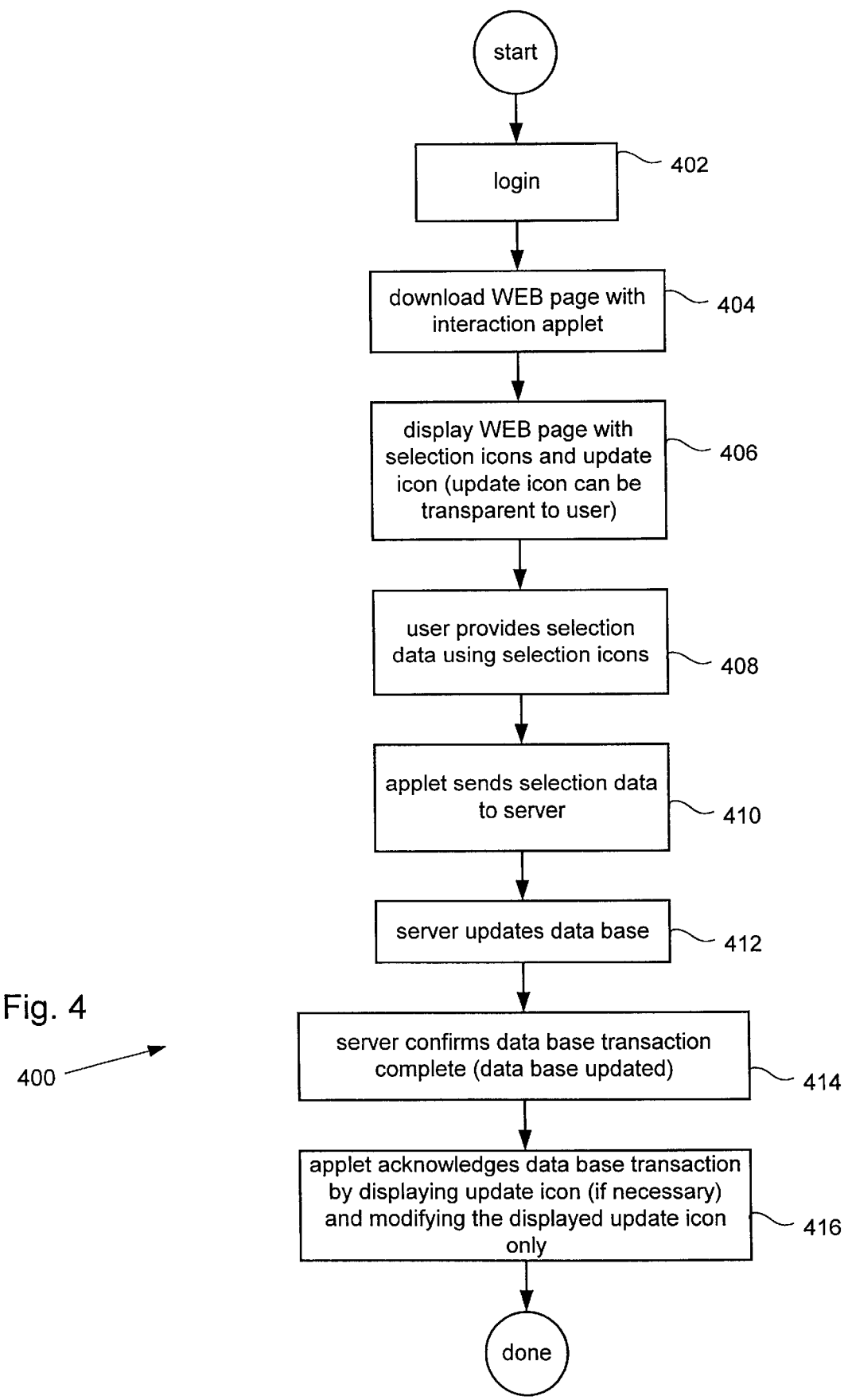
FIG. 4 shows a flowchart detailing a process for providing a highly interactive transaction environment in a distributed network of computers in accordance with an embodiment of the invention.

FIG. 4 shows a flowchart detailing a process 400 for providing a highly interactive transaction environment in a distributed network of computers in accordance with an embodiment of the invention. The process 400 begins at 402 by the user logging in which in one embodiment can be implemented by way of the process 300 described above. Once the user has been successfully logged in and verified, a WEB page is downloaded from a server computer having an interaction applet embedded therein at 404. It should be noted that in some implementations of the invention, the server computer can download a custom WEB page consistent with the identity of the verified user. In any case, the browser displays WEB page along an update icon and various selection icons that allow the user to provide selection data at 406. In some cases, the update icon is transparent to the user and is only made visible when modified thereby reducing the "clutter" typical of many commercially available WEB pages. At 408, the user provides selection data using any of the various selection icons. At 410, the applet, in turn, sends the selection data to server computer. In those systems that utilize an HTTP type protocol, the selection data is send via an HTTP request while in Java based systems, the applet can communicate with a JavaServer-Page. At 412, in response to the receipt of the selection data, the server computer updates the server-side data base accordingly. Once updated, the server computer confirms that the data base transaction has been successfully completed (i.e., the data base has been updated) by sending a confirmation to the applet at 414. The applet then acknowledges the data base transaction at 416 by displaying (if necessary) and modifying the update icon only leaving the remainder of the WEB page substantially unchanged.

Figure 5:
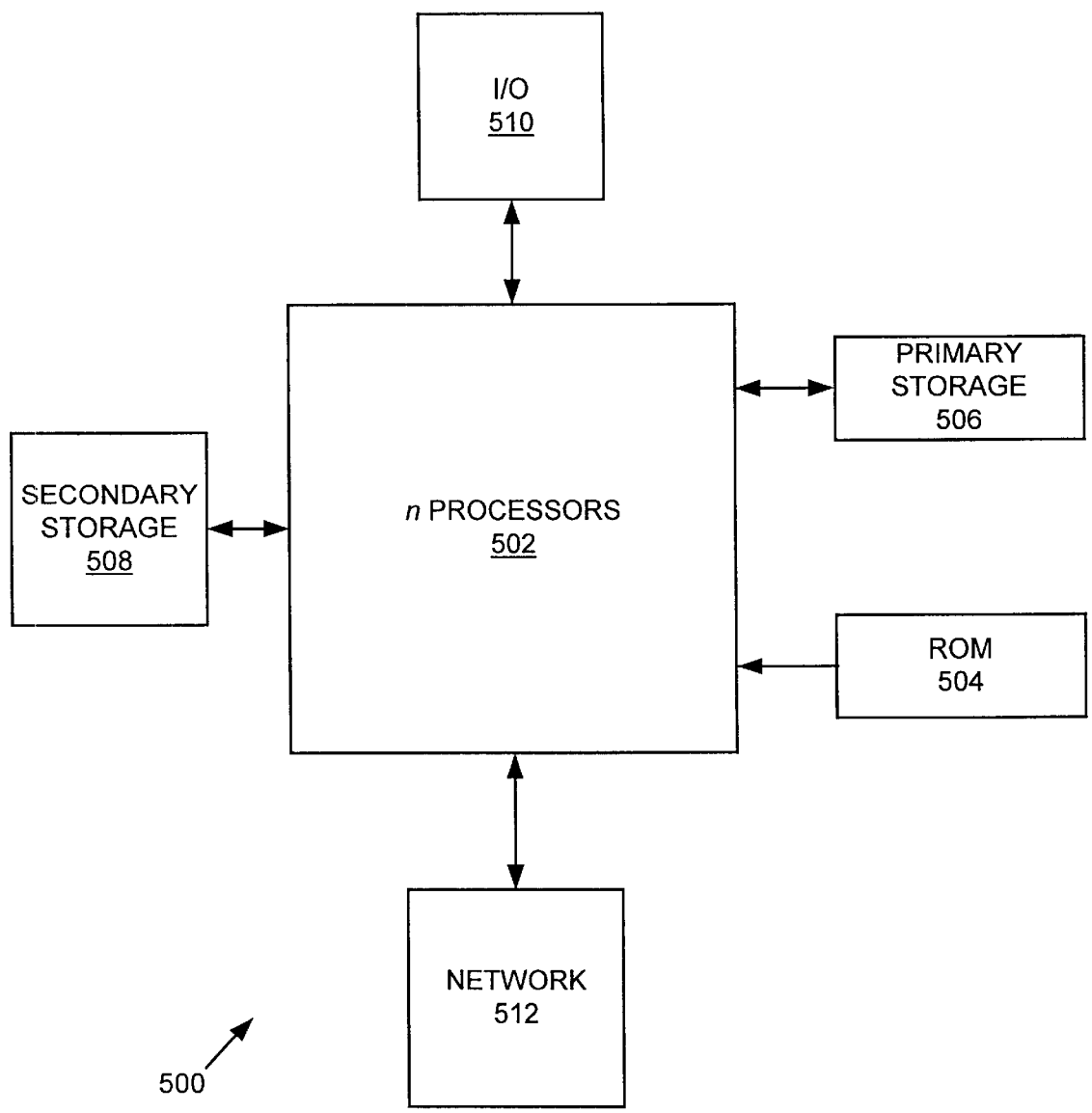
FIG. 5 illustrates a computer system that can be employed to implement the present invention.

FIG. 5 illustrates a computer system 500 that can be employed to implement the present invention. The computer system 500 or, more specifically, CPUs 502, may be arranged to support a virtual machine, as will be appreciated by those skilled in the art. As is well known in the art, ROM acts to transfer data and instructions uni-directionally to the CPUs 502, while RAM is used typically to transfer data and instructions in a bi-directional manner. CPUs 502 may generally include any number of processors. Both primary storage devices 504, 506 may include any suitable computer-readable media. A secondary storage medium 508, which is typically a mass memory device, is also coupled bi-directionally to CPUs 502 and provides additional data storage capacity. The mass memory device 508 is a computer-readable medium that may be used to store programs including computer code, data, and the like. Typically, mass memory device 508 is a storage medium such as a hard disk or a tape which generally slower than primary storage devices 504, 506. Mass memory storage device 508 may take the form of a magnetic or paper tape reader or some other well-known device. It will be appreciated that the information retained within the mass memory device 508, may, in appropriate cases, be incorporated in standard fashion as part of RAM 506 as virtual memory. A specific primary storage device 504 such as a CD-ROM may also pass data uni-directionally to the CPUs 502.

CPUs 502 are also coupled to one or more input/output devices 510 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 502 optionally may be coupled to a computer or telecommunications network, e.g., an Internet network or an intranet network, using a network connection as shown generally at 512. With such a network connection, it is contemplated that the CPUs 502 might receive information from the network, or might output information to the network in the course of performing the above-described method steps. Such information, which is often represented as a sequence of instructions to be executed using CPUs 502, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention.

Although the methods of providing efficient techniques for providing a highly interactive transaction environment in accordance with the present invention are particularly suitable for implementation in browser environments, the methods may generally be applied in any suitable low bandwidth or high bandwidth system. In particular, the methods are suitable for use in digital appliances, low bandwidth networks. Such low bandwidth systems include, but are not limited to: virtual private networks direct serial connections across telephone lines ("BBS systems"), and LANs and WANs regardless of network protocol.

While the present invention has been described as being used with a computer system that has an associated web browser and web server, it should be appreciated that the present invention may generally be implemented on any suitable computer system. Therefore, the present examples are to be considered as illustrative and not restrictive, and the invention is not to be limited to the details given herein, but may be modified within the scope of the appended claims along with their full scope of equivalents.

What is claimed is:

1. In a multithreaded computing environment, a platform independent method for providing a highly interactive transaction session between a browser residing on a client computer and a date base coupled to a server computer that is in turn coupled to a distributed network of computing devices, comprising:

displaying a requested web page at the client computer, wherein the displayed web page includes a plurality of input selection icons and an update icon;

sending selection data corresponding to a user selected input to the server computer by the browser;

updating a server-side data base based upon the selection data; and updating only the update icon to indicate that the data base has been successfully updated;

wherein the sending comprises:
generating selection data using selected one of the plurality of input selection icons;
passing the selection data from the selected input icon to an event handler included in the browser;
passing the selection data from the event handler to the interaction applet; and
passing the selection data from the interaction applet to the server computer;

wherein the updating comprises:
generating a first http request by an http request generator, wherein the first http request includes a database update command corresponding to the selection data;
passing the database update command to the server computer; and
updating the database based upon the selection data;

wherein when the database has been successfully updated, generating a second http request by the http request generator, wherein the second http request includes a database update successful flag indicating that the database has been successfully updated;
sending the second http request interation applet; and
updating the update icon only by the interaction applet indicating that the database has been successfully updated.

2. A method as recited in claim 1, wherein the web page includes an interaction applet arranged to update the update icon.

3. A method as recited in claim 1, wherein the browser is a Java based browser.

4. A method as recited in claim 1, wherein the selection data includes Javascript in the form of javascript arguments and wherein the event handler is a JavaScript onClick handler.

5. A method as recited in 4, wherein the interaction applet passes the javascript arguments received from the JavaScript onClick handler on to a JavaServerPage(JSP) by way of the first http request.

6. Computer program product for providing a highly interactive transaction session between a browser residing on a client computer and a data base coupled to a server computer that is in turn coupled to a distributed network of computing devices, comprising:

computer code for displaying a requested web page at the client computer, wherein the displayed web page includes a plurality of input selection icons and an update icon;

computer code for sending selection data corresponding to a user selected input to the server computer by the browser;

computer code for updating a server-side data base based upon the selection data;

computer code for updating only the update icon to indicate that the data base has been successfully updated; and computer readable medium for storing the computer code;

wherein the computer code for sending further comprises:
  computer code for generating selection data using a selected one of the plurality of input selection icons;
  computer code for passing the selection data from the selected input icon to an event handler included in the browser;
  computer code for passing the selection data from the event handler to the interaction applet; and
  computer code for passing the selection data from the interaction applet to the server computer;

wherein the computer code for updating further comprises:
  computer code for generating a first http request by an http request generator, wherein the first http request includes a database update command corresponding to the selection data;
  computer code for passing the database update command to the server computer; and
  computer code for updating the database based upon the selection data;

wherein the computer code for determining when the database has been successfully updated comprises:
  computer code for generating a second http request by the http request generator, wherein the second http request includes a database update successful flag indicating that the database has been successfully updated;
  computer code for sending the second http request to the interaction applet; and
  computer code updating the update icon only by the interaction applet indicating that the database has been successfully updated.

7. Computer program product as recited in claim 6, wherein the web page includes computer code for providing an interaction applet arranged to update the update icon.

8. Computer program product as recited in claim 6, wherein the browser is a Java based browser.

* * * * *

UNITED STATES PATENT AND TRADEMARK OFFICE
CERTIFICATE OF CORRECTION

PATENT NO. : 6,728,769 B1
DATED : April 27, 2004
INVENTOR(S) : John T. Hoffmann

It is certified that error appears in the above-identified patent and that said Letters Patent is hereby corrected as shown below:

<u>Column 8,</u>
Line 12, change "date base" to -- data base --.
Line 25, add -- a -- after "using".
Line 46, change "interation" to -- interaction --.

Signed and Sealed this

Twenty-fourth Day of August, 2004

JON W. DUDAS
*Director of the United States Patent and Trademark Office*